Sept. 17, 1929.     T. S. KEMBLE     1,728,889
REAR AXLE CONSTRUCTION FOR AUTOMOBILES
Filed July 2, 1924     3 Sheets-Sheet 1

Thomas S. Kemble
Inventor

By Attorneys Dodson & Roe

Sept. 17, 1929.   T. S. KEMBLE   1,728,889
REAR AXLE CONSTRUCTION FOR AUTOMOBILES
Filed July 2, 1924   3 Sheets-Sheet 2

Sept. 17, 1929.   T. S. KEMBLE   1,728,889
REAR AXLE CONSTRUCTION FOR AUTOMOBILES
Filed July 2, 1924   3 Sheets-Sheet 3
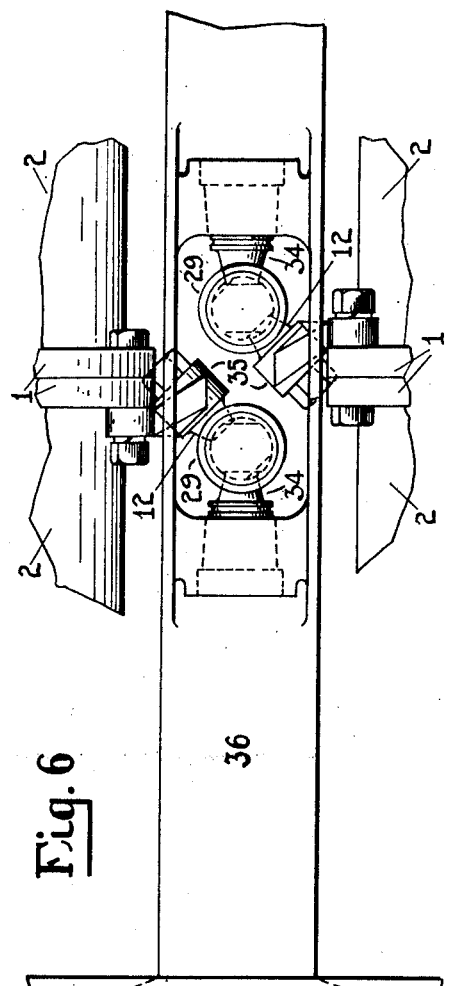
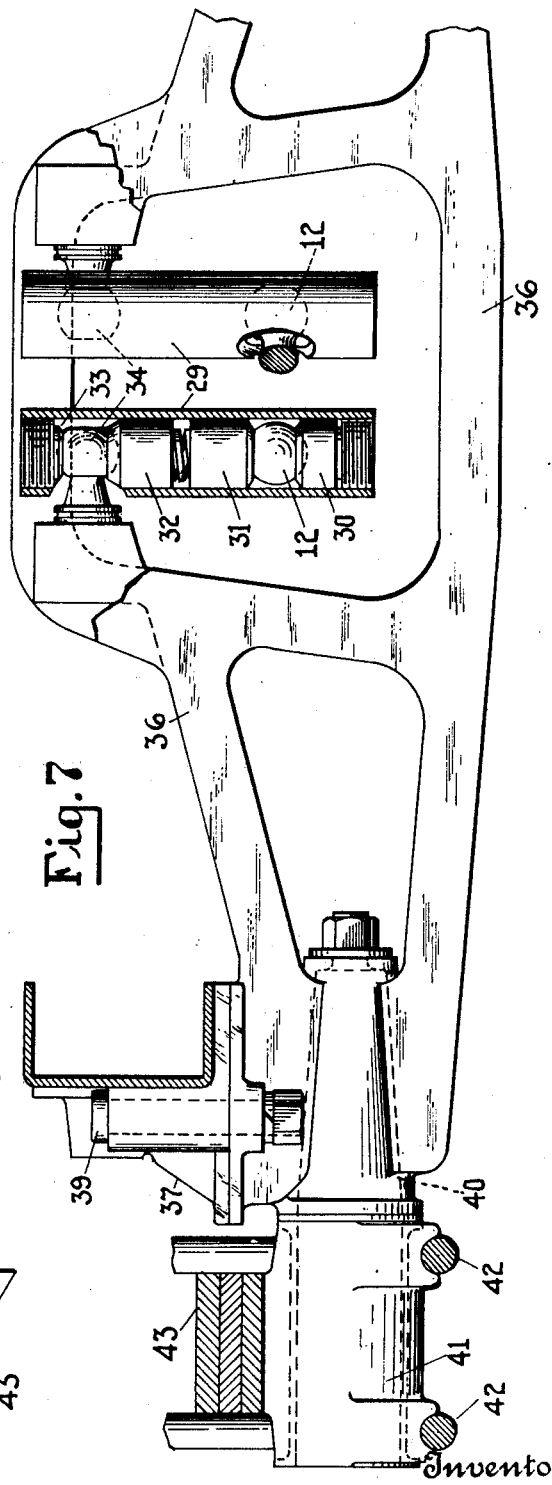
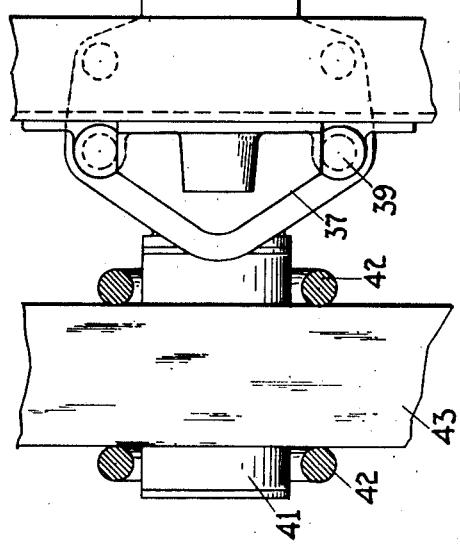
Inventor
Thomas S. Kemble
By Attorneys Rodert & Roe Patented Sept. 17, 1929

1,728,889

UNITED STATES PATENT OFFICE

THOMAS S. KEMBLE, OF CLEVELAND, OHIO, ASSIGNOR, BY MESNE ASSIGNMENTS, TO UNIVERSAL GAS ELECTRIC COMPANY, OF LAWRENCE, KANSAS, A CORPORATION OF DELAWARE

REAR-AXLE CONSTRUCTION FOR AUTOMOBILES

Application filed July 2, 1924. Serial No. 723,772.

My invention relates to that class of automobiles which is provided with six wheels, two pairs of which operate as driving wheels, and has for its object to provide for the location of the motor links close together and in the same cross-wise plane which eliminates the torsion in the cross member and reduces the bending moment to a minimum because the torque reactions are in opposite directions, thus tending to neutralize one another.

My invention has for its further object, to provide for the location of a wheel carrying a live axle shaft, countershaft, and motor center line and torque arm pivot, so as to permit the construction of a relatively low body and chassis frame, and to reduce the unsprung weight.

My invention has for its further object, the provision of tandem motor frames, which are absolutely essential to the successful operation of the motors and perform a separate and additional function—that of load-carrying members—and which perform the function of the center of ordinary load-carrying axles, while the housing for the gear train, which also is absolutely essential, performs an additional function, namely, that of a load-carrying member. These motor frames are offset towards the torque arm pivots to reduce the unsprung weight, thus permitting a material reduction in the floor height of the vehicle, which is of vital importance in the construction of passenger busses which are coming so generally into use.

My means of accomplishing the foregoing objects may be more readily understood by having reference to the drawings already filed in this case, which are to be considered as a part of this specification, in which—

*Sheet 1.*—Fig. 1 is a plan view of the double axle assembly complete with attachments to chassis frame;

Figure 4:
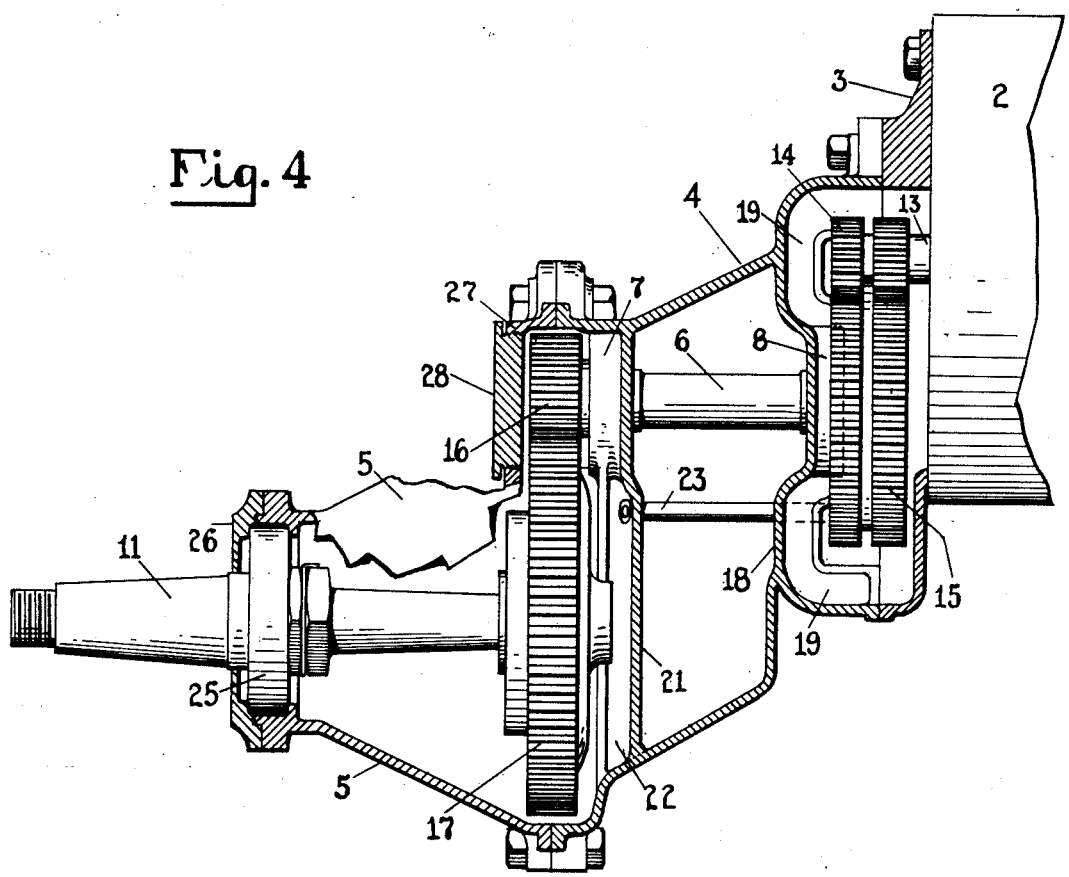
Figure 5:
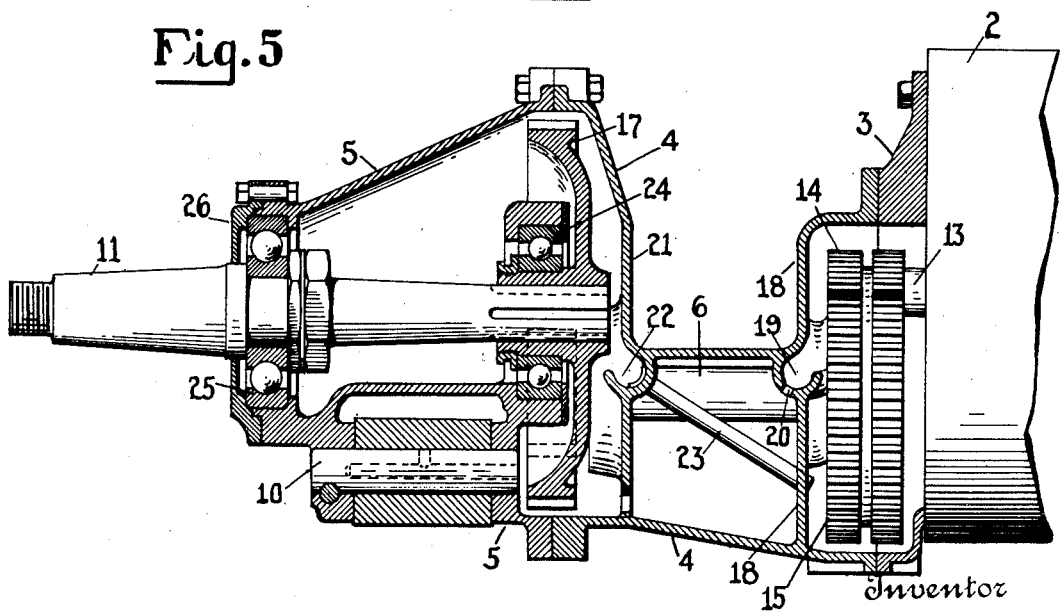

*Sheet 2.*—Fig. 4 is a plan view of an end of one axle, with sections broken away to expose the live axle, countershaft and gear train; it also shows the means for oil circulation;

Fig. 5 is a side elevation of same, with sections broken away to show the means for oil circulation, the method of supporting the live axle gear and shaft, and the method of attaching the spring to the axle and of lubricating the spring eye and pin;

*Sheet 3.*—Fig. 6 is a plan view of the center and an end of the detachable crossmember carrying the spring pivot, motor links, and ball connections, of the torque system;

Fig. 7 is an elevation of same.

Similar reference numerals refer to similar parts throughout the entire specification.

Figure 1:
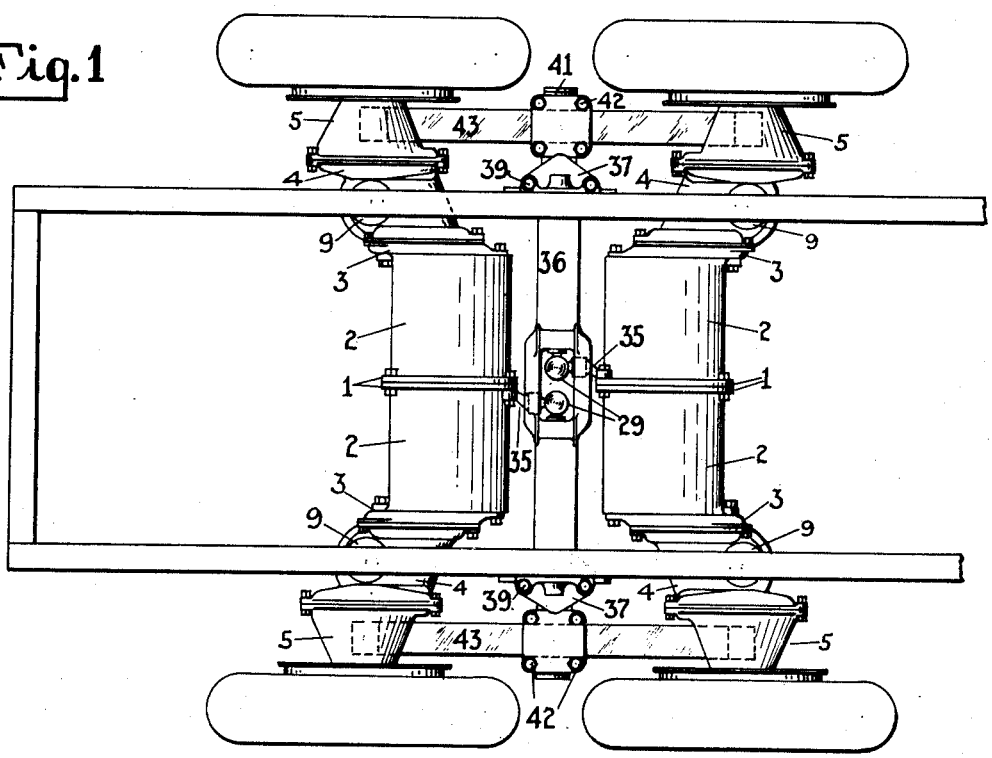
Figure 2:
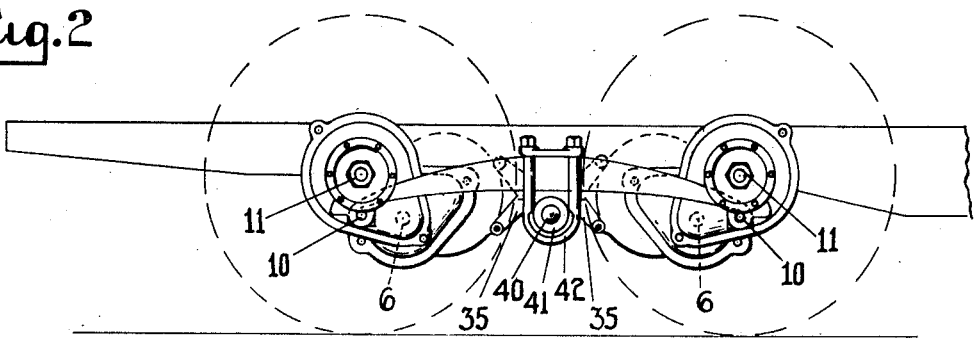
Fig. 2 is a side elevation of same, with wheels shown phantom to expose the axles and side spring to view.
Figure 3:
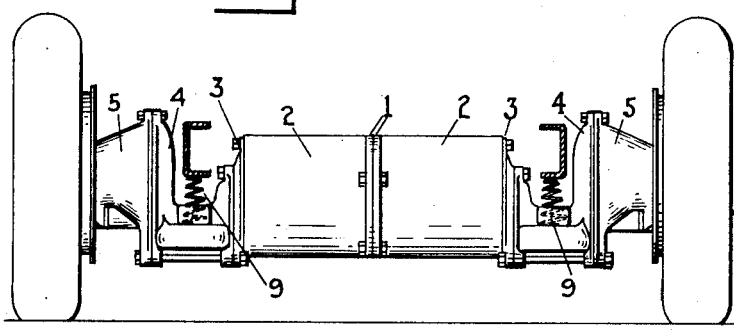
Fig. 3 is a rear end elevation of the axle, with the chassis side frames shown in section over the axle.

As shown in the drawings, and clearly seen in Figs. 1, 2 and 3, each load-carrying axle is composed of the following: At midsection between the wheels are end plates 1, of two motors bolted together to form the center section of the load-carrying axle. I shall only describe the construction from the center out to a wheel, for the reason that this construction is duplicated in both of the axles and on both sides. It will therefore be understood that the description applies equally to the construction outward from either side of the end plates 1.

Motor frame 2 are secured to the end plate 1, by means of bolts or any other suitable or convenient method of fastening. To the motor frame 2 is secured, by bolts as illustrated, a motor end plate 3, this end plate 3 also forming an end plate for the reduction gear housing 4. The main body of the reduction gear housing 4 carries the countershaft 6, with its bearings 7 and 8, as may be clearly seen in Fig. 4. This gear housing 4 also carries the auxiliary spring and bumper 9, as clearly shown in Fig. 3. The live axle carrying member 5 also forms an end of the reduction gear housing 4, and carries the spring pin 10 which, as shown, is below the live axle 11, and may be used as, or to support, brake anchorage, brake lever pivot, etc.

From the foregoing description, it will be apparent that these parts 1, 2, 3, 4 and 5 all combine to form the load-carrying member, in addition to their other functions, so that the necessity for any load-carrying axle, as in a standard truck, is entirely obviated. Also, by their arrangement, extending progressively off center from the wheel axle or center line of the live axle 11 toward a torque ball 12, they form part of the torque arm of the axle.

It is essential to the proper functioning of this system, that the torque arm shall constrain the axle assembly only from rotating about the center line of the wheels, but that it shall not constrain the axle from other motion, lest it disturb the otherwise flexible functions of the springs. I accomplish this by providing what I term a motor link body, which is formed of a cylindrical sleeve or link 29, which is carried by a ball 34 formed on the end of a bracket 35 which is attached to the motor and plates 1 in any suitable or convenient manner. Within the cylindrical sleeve or link 29 are mounted members 30 and 31, the adjacent faces of which are turned out to form sockets for the torque arm pivot or ball 12. Members 32 and 33, also mounted within the cylindrical sleeve or link 29, likewise have their adjacent faces similarly turned to provide sockets which receive the ball 34, which is preferably formed as a part of the bracket 35.

By locating the countershaft 6 lower than the wheel center or live axle 11, I provide clearance under a low chassis side frame, and toward the torque arm pivot or ball 12. This provides less vertical motion relative to the frame and the body of the vehicle than occurs at the wheel center or live axle 11, and thus reduces unsprung weight. The shaft 13 of the electric motor is located so that its center is higher than the countershaft 6 under the motor, while offsetting this towards the pivot or ball 12 on the torque arm provides additional ground clearance and less vertical motion relative to the frame, and this also reduces the unsprung weight. As pointed out, this location should be away from the center line of the live or wheel axle.

As shown in Figs. 4 and 5, the motor shaft gear 14 drives the countershaft pinion 15, and the countershaft gear 16 drives the pinion 17 on the live axle 11.

It may be noted that locating the countershaft 6 lower than the live axle 11 and the motor or differential shaft 14, tends to cause (and, as shown in the drawings, does cause) the driven pinion 15 on the countershaft 6 to dip into an oil well in the gear case, more deeply than do the slower moving countershaft gear 16 and live axle pinion 17. With a plain oil well extending across the bottom of the gear case, this would result in unnecessary loss, due to oil turbulence and excess lubricant on the high speed gears in order to supply adequate lubrication to the lower speed gears.

In order to eliminate this loss, I provide that the wall 18 of the reduction gear housing 4 shall constitute a dam crosswise of the bottom of the gear case adjacent to the countershaft pinion 15, and on the wall 18 I provide a trough 19 adapted to catch the oil flowing down the wall 18 and to discharge this oil through openings 20 into an oil well on the side of the wall 18 opposite to the countershaft pinion 15. This is arranged to quickly discharge any excess oil which might otherwise remain in the pocket surrounding the lower part of the pinion 15.

On the other wall, 21, of the gear case 4, I provide an oil-catching trough 22, arranged to discharge oil through a tube 23 into a well surrounding the bottom of the countershaft pinion 15. This trough is so arranged, as to location and size, that it will supply enough oil to properly lubricate the pinion 15 without providing excess lubrication. In action the oil is in constant circulation, and the discharging capacity of the trough 19 is made to exceed the refilling capacity of the trough 22 by a degree sufficient to insure that a proper oil level is maintained in the well surrounding the lower part of the countershaft pinion 15,—this forming the subject matter of a divisional application which is being prepared.

The live axle pinion 17 is slidably splined to the live axle 11, and the hub of the pinion 17 is mounted in the bearing 24, so that the live axle 11 with its outboard bearing 25 may be withdrawn without disturbing anything but the cover plate 28.

It will be observed that all of the gears are "overhung," permitting maximum space economy endwise.

As is clearly shown in Fig. 4, a removable cover plate 28, which closes an opening in the wall of the live axle carrying member 5, is provided opposite the countershaft gear 16. This gear 16 is slidably splined upon the countershaft 6, so that it may easily be removed. This permits one to disconnect the gear train between the motor and the wheel, without disturbing the functioning of the live axle 11 and its bearings 24 and 25, and without disassembly of the motor or the gear case 4, other than removing the cover plate 28.

With my system, in the event of a breakdown of any of the driving mechanism, the motor which is inoperative may be disconnected, and the vehicle may then proceed, driven by the motors which are not thus disconnected. In extreme cases three motors may be thus disconnected, and the vehicle operated under low power by one motor alone,—this forming the subject-matter of another divisional application which is being prepared.

The detachable cross member 36 is connected to brackets 37 by bolts 39. In the cross member 36 I mount spring pivots 40, on the outer part of which I mount U-bolts 42 which support springs 43 rotatably on the spring pivots 40. It will be obvious from the foregoing description that, should necessity arise, by withdrawing the bolts 39 the entire cross-member 36 is detached from the frame, and the whole assembly—axles, torque connections, wheels, and springs—may be rolled out as a unit, from under the body of the vehicle.

The arrangements here used are applicable to gear-driven axles, by substituting a differential and carrier for the electric motors, and by providing suitable drive connections for the differential,—this forming the subject-matter of another divisional application which is being prepared.

The function of the auxiliary spring and bumper 9 on the axle of this rear truck, differs from that of a bumper on the rear axle of a conventional four-wheel vehicle, as follows:

In the conventional vehicle, the bumper comes into play only after the main supporting spring has been deflected by a predetermined amount beyond the normal. With a spring strong and stiff enough for the clearance provided, a bumper is not required. None is ever necessary at very slow speed, as the clearance cannot be used up.

In my construction (wherein the main supporting springs 43 are pivoted, as previously described, and as clearly seen in Figs. 6 and 7), if the vehicle slowly crosses a deep narrow ditch at right angles, first the rear axle of the rear truck will contact with the chassis or upon a bumper provided; then, as the front axle rises out of the ditch on the far side, and the rear axle descends into the ditch, the chassis frame will leave contact with the rear axle and finally make contact with the front axle.

It may be seen from the foregoing that in the conventional vehicle, any bumper contact occurs only after a certain predetermined deflection of the main supporting spring beyond normal; whereas bumper contact may occur in my construction without any deflection of the main supporting spring beyond normal. In fact, referring to the preceding illustration, where the front axle descends in crossing the ditch, the bumper contact will actually occur while the deflection of the main supporting springs is less than normal.

Furthermore, in the conventional vehicle, the main supporting spring carries at all times a load which is related to the instantaneous height of the frame relative to the axle, and the bumper can carry only such excess load as would otherwise have deflected the main supporting spring beyond that allowed by the clearance provided; whereas in my construction the auxiliary springs or bumpers 9 on one axle may carry the full load, while the main supporting spring is under less than normal, or even negative from normal stress.

It will be seen, therefore, that the springs 9 here provided are, as regards one function, true auxiliary or alternative springs. To leave off these auxiliary springs 9, would be equivalent to providing that under certain conditions the vehicle shall be springless at the rear.

This construction permits the manufacture of a truck with a minimum ground clearance, for as the body moves down (relative to the axle), the motor moves down a less distance, thus approaching the body or chassis, hence the clearance between the chassis and the road need be only the difference between the vertical motion of the motor and the body or chassis, plus the vertical depth of the motor, plus the minimum temporary ground clearance; whereas in the standard practice, the clearance between the body and the ground must be, the vertical motion of the body relative to the ground, plus the slight clearance between the motor and the body, plus the vertical depth of the motor, plus the minimum permanent ground clearance.

Having described my invention, what I regard as new, and desire to secure by Letters Patent of the United States, is:

1. In a motor vehicle, a chassis frame, a casing which forms a load carrying axle member flexibly connected to said chassis frame, a torque arm attached thereto, an electric motor within said casing, a portion of said load carrying axle member forming the frame of said electric motor, wheels rotatively mounted at each end of said casing, the center line of the motor being offset from a vertical plane through the axis of the wheels and towards the torque arm whereby the vertical inertia forces arising from the weight of said axle are substantially reduced.

2. In a motor vehicle, a chassis frame, a casing which constitutes an axle and forms a load carrying member flexibly connected to said chassis frame, a torque arm attached thereto, wheels rotatively mounted at the end of said casing, an electric motor within said casing, a portion of said load carrying axle member forming a part of its frame, and a reduction gear housing which forms part of the load carrying casing, the center line of the said motor being offset from a vertical plane through the axis of the wheels, and towards the torque arm, whereby the vertical inertia forces arising from the weight of said axle are substantially reduced.

3. In a motor vehicle, a chassis frame, an axle comprising a casing, flexibly connected to said chassis frame, an electric motor within said casing, the frame of which forms an essential part of said casing, the ends of said axle forming reduction gear housings, a torque arm secured to said axle, wheels rotatively mounted at the ends of said gear housing, the center line of the motor frame being offset from a vertical plane through the axis of the wheels and towards said torque arm whereby the vertical inertia forces arising from the weight of said axle are substantially reduced.

4. In a motor vehicle, a chassis frame, a casing which forms a load carrying axle member flexibly connected to said chassis frame, portions of said casing forming frames for two electric motors mounted inside said casing, the ends of said load carrying axle member forming gear housings, a torque arm secured to said load carrying axle member, wheels rotatively mounted at each end of said casing, the center line of the motors being offset from a vertical plane through the axis of the wheels and towards the torque arm.

5. In a motor vehicle, a chassis frame, a casing which forms a load carrying axle member, flexibly connected to said chassis frame, portions of said load carrying axle member forming frames for two electric motors within said casing, the ends of said casing forming gear housings, a torque arm secured to said casing, a support therefor, wheels rotatively mounted at each end of said casing, the center line of the motors being offset from a vertical plane through the axis of the wheels and towards said torque arm whereby the vertical inertia forces arising from the weight of said axle are substantially reduced.

6. In a motor vehicle, a chassis frame, a pair of casings adjacent each other which form load carrying axle members, flexibly connected to said chassis frame, two electric motors within each of said casings, portions of said load carrying axle members forming their frames, the ends of said casings forming gear housings, torque arms secured to said casings, wheels rotatively mounted at each end of said casings, the center line of the motors being offset from a vertical plane through the axis of the wheels and towards each other whereby the vertical inertia forces arising from the weight of said axle members are substantially reduced.

7. In a motor vehicle, a chassis frame, a pair of casings adjacent each other which form load carrying axle members flexibly connected to said chassis frame, a pair of electric motors in axial alignment in each of said load carrying axle members, portions of which load carrying axle members form the frames of said motors, torque arms attached to said axle members, wheels rotatively mounted at each end of said casings, the center line of each pair of motors being offset from a vertical plane through the axis of the wheels and towards the torque arms whereby the vertical inertia forces arising from the weight of said axle are substantially reduced.

8. In a motor vehicle, a chassis frame, a pair of casings adjacent each other which form load carrying axle members, two pairs of motors in axial alignment in said casings, portions of which constitute the frames of said motors, torque arms attached to said axle members and said chassis frame, the outer end portions of said load carrying axle members constituting reduction gear housings, wheels rotatably mounted at each end of each of said casings, the center line of each pair of motors being offset towards each other and from a vertical plane through the axis of its wheels, and towards its torque arm, whereby the vertical inertia forces arising from the weight of said axles are substantially reduced.

9. In a motor vehicle, a chassis frame, a casing which forms a load carrying axle member, means to flexibly connect said chassis frame to said axle member, a torque arm attached to said axle member and connected to said frame, a motor within said casing, a portion of which casing constitutes the frame of said motor, wheels rotatively mounted at each end of said axle member, the center line of the motor being offset from a vertical plane through the axis of the wheels and towards the torque arm whereby the vertical inertia forces arising from the weight of said axle are substantially reduced.

10. In a motor vehicle, a chassis frame, a casing which forms a load carrying axle member, means to flexibly connect said chassis frame to said axle member, a torque arm attached to said axle member and connected to said frame, a motor within said casing, a portion of which constitutes the frame of said motor, the ends of said axle member forming a reduction gear housing, wheels rotatively mounted at each end of said axle member, the center line of the motor being offset from a vertical plane through the axis of the wheels and towards the torque arm whereby the vertical inertia forces arising from the weight of said axle are substantially reduced.

11. In a motor vehicle, a chassis frame, a pair of casings which form load carrying axle members, a pair of motors mounted within each of said casings, portions of said casings forming the frames thereof, means to flexibly connect said chassis frame to said axle members, portions of said load carrying members forming gear housings, torque arms secured to said axle members and to said chassis frame, wheels rotatively mounted at each end of said casings, the center line of said motors being offset from a vertical plane through the axis of the wheels, and towards the torque arms, whereby the vertical inertia forces arising from the weight of said axle are substantially reduced.

12. In a motor vehicle, a chassis frame, a pair of casings which form load carrying axle members mounted adjacent each other, two pairs of motors in axial alignment mounted within the casings which form said load carrying axle members, portions of said casings forming the frames of said motors, means to flexibly connect said chassis frame to said load carrying axle members, torque arms attached to said axle members and to said chassis frames, the outer end portions of said casings forming reduction gear housings, wheels rotatively mounted at each end of each of said casings, the center line of each pair of motors being offset towards each other from a vertical plane through the axis of its wheels and towards its torque arm whereby the vertical intertia forces arising from the weight of said axle are substantially reduced.

THOS. S. KEMBLE.